US012792503B2

(12) United States Patent
Sanagavarapu et al.

(10) Patent No.: US 12,792,503 B2
(45) Date of Patent: Nov. 10, 2026

(54) METHODS AND SYSTEMS FOR STORING DATA IN A MEMORY DEVICE HAVING DYNAMIC NAMESPACE WITH DIFFERENT INDIRECTION UNIT SIZES

(71) Applicant: SK Hynix NAND Product Solutions Corp., Rancho Cordova, CA (US)

(72) Inventors: Kalyankumar Sanagavarapu, Longmont, CO (US); Jonathan Hughes, Longmont, CO (US)

(73) Assignee: Solidigm Inc., Rancho Cordova, CA (US)

( * ) Notice: Subject to any disclaimer, the term of this patent is extended or adjusted under 35 U.S.C. 154(b) by 0 days.

(21) Appl. No.: 19/005,955

(22) Filed: Dec. 30, 2024

(65) Prior Publication Data

US 2026/0186956 A1 Jul. 2, 2026

(51) Int. Cl.
*G06F 12/02* (2006.01)
*G06F 12/1009* (2016.01)

(52) U.S. Cl.
CPC ........ *G06F 12/023* (2013.01); *G06F 12/1009* (2013.01)

(58) Field of Classification Search
CPC ...... G06F 12/10; G06F 12/1009; G06F 12/02; G06F 12/023; G06F 12/0246; G06F 12/0238
See application file for complete search history.

(56) References Cited

U.S. PATENT DOCUMENTS 9,208,082 B1 * 12/2015 Cheriton ............... G06F 3/0619
10,222,984 B1 3/2019 O'Brien, III et al.
10,324,834 B2 6/2019 Seo et al.
11,656,778 B2 * 5/2023 Frolikov ................. G06F 3/061 711/154
2010/0030999 A1 2/2010 Hinz
2018/0121344 A1 * 5/2018 Seo ..................... G06F 12/0246
2019/0347010 A1 11/2019 Frolikov (Continued)

OTHER PUBLICATIONS

S. Jain, Y. Chen, Z.-L. Zhang and S. Jain, "VIRO: A scalable, robust and namespace independent virtual Id routing for future networks," 2011 Proceedings IEEE Infocom, Shanghai, China, 2011, pp. 2381-2389.*

(Continued)

*Primary Examiner* — Pierre Michel Bataille
(74) *Attorney, Agent, or Firm* — HG LAW LLP

(57) ABSTRACT

A system and method for storing data in a memory device. The method includes transmitting, to a host, information indicative of a first allowable maximum size of a first namespace associated with a first IU and a second allowable maximum size of a second namespace associated with a second IU. The first and the second IUs may be of different sizes. The includes comprise receiving configuration information comprising one or more instructions to: generate a first L2P table associated with the first IU based on the first allowable maximum size, and generate a second L2P table associated with the second IU based on the second allowable maximum size and generating the first L2P table and the second L2P table based on the configuration information; and causing first data and second data to be stored in the first namespace and the second namespace using the first and second L2P tables respectively.

20 Claims, 5 Drawing Sheets

(56) References Cited

U.S. PATENT DOCUMENTS

| | | | | |
|---|---|---|---|---|
| 2020/0089619 | A1* | 3/2020 | Hsu | G06F 3/0604 |
| 2020/0249873 | A1* | 8/2020 | Hsu | G06F 3/0659 |
| 2021/0081325 | A1* | 3/2021 | Bradshaw | G06F 9/5077 |
| 2021/0191875 | A1* | 6/2021 | Bradshaw | G06F 12/0246 |
| 2021/0294506 | A1* | 9/2021 | Tadokoro | G06F 3/0665 |
| 2022/0035738 | A1 | 2/2022 | Brandt | |
| 2022/0083256 | A1* | 3/2022 | Muthiah | G06F 3/0604 |
| 2022/0357847 | A1* | 11/2022 | Frolikov | G06F 12/10 |
| 2023/0058424 | A1* | 2/2023 | Frolikov | G06F 3/0659 |
| 2023/0367708 | A1* | 11/2023 | V M | G06F 12/0246 |
| 2025/0110651 | A1* | 4/2025 | Miller | G06F 3/0631 |
| 2025/0165179 | A1* | 5/2025 | Colgrove | G06F 3/0679 |
| 2025/0265185 | A1* | 8/2025 | Hodes | G06F 12/0653 |

OTHER PUBLICATIONS

Y. Jin, H.- W. Tseng, Y. Papakonstantinou and S. Swanson, "KAML: A Flexible, High-Performance Key-Value SSD," 2017 IEEE International Symposium on High Performance Computer Architecture (HPCA), Austin, TX, USA, 2017, pp. 373-384.*

R. Jin, J.-Y. Paik, J. Wang, Y. Biadgie, Y. Rao and T.-S. Chung, "Managing Massive Amounts of Small Files in All-Flash Storage," 2020 IEEE 44th Annual Computers, Software, and Applications Conference (COMPSAC), Madrid, Spain, 2020, pp. 386-393.*

* cited by examiner

METHODS AND SYSTEMS FOR STORING DATA IN A MEMORY DEVICE HAVING DYNAMIC NAMESPACE WITH DIFFERENT INDIRECTION UNIT SIZES

TECHNICAL FIELD

The present disclosure is related to devices and methods for storing data on a memory device, and more particularly, the present disclosure is related to dynamic namespace allocation with different indirection unit sizes.

BACKGROUND

Memory devices, such as solid-state drives (SSDs) rely on a dynamic random-access memory (DRAM) to maintain a logical to physical (L2P) table. The size of the L2P table is directly proportional to the indirection unit (IU) size. This means that the ever increasing capacities of the storage devices require larger and larger DRAM sizes. This can become a significant bottleneck as SSD capacities increase. Additionally, while finer IUs have been sufficient for most standard host applications, the growing prevalence of large file objects (e.g., videos, photos) demand larger granularity write operations and therefore coarser IUs. This mismatch between IU size and write granularity can also lead to unsustainable DRAM requirements, especially for high-capacity SSDs.

SUMMARY

In accordance with a first aspect of the present disclosure, a method of storing data in a memory device is provided. The method may comprise: transmitting, to a host, information indicative of a first allowable maximum size of a first namespace associated with a first Indirection Unit (IU) and a second allowable maximum size of a second namespace associated with a second IU, wherein the first IU and the second IU are of different sizes, receiving, from the host, configuration information comprising one or more instructions to: generate a first logical to physical (L2P) table associated with the first IU based on the first allowable maximum size, and generate a second L2P table associated with the second IU based on the second allowable maximum size, generating the first L2P table and the second L2P table based on the configuration information and causing first data to be stored in the first namespace using the first L2P table, and second data to be stored in the second namespace using the second L2P table.

In accordance with a second aspect of the present disclosure, a system comprising a memory device coupled to a host is provided. The memory device may comprise processing circuitry to: transmit, to the host, information indicative of a first allowable maximum size of a first namespace associated with a first Indirection Unit (IU) and a second allowable maximum size of a second namespace associated with a second IU, wherein the first IU and the second IU are of different sizes, receive, from the host, configuration information comprising one or more instructions to: generate a first logical to physical (L2P) table associated with the first IU based on the first allowable maximum size, and generate a second L2P table associated with the second IU based on the second allowable maximum size, generate the first L2P table and the second L2P table based on the configuration information; and cause: first data to be stored in the first namespace using the first L2P table, and second data to be stored in the second namespace using the second L2P table.

In accordance with a third aspect of the present disclosure, a non-transitory computer readable medium is the provided. The non-transitory computer readable medium stores program code that, when executed, performs a method comprising: transmitting, to a host, information indicative of a first allowable maximum size of a first namespace associated with a first Indirection Unit (IU) and a second allowable maximum size of a second namespace associated with a second IU, wherein the first IU and the second IU are of different sizes, receiving, from the host, configuration information comprising one or more instructions to: generate a first logical to physical (L2P) table associated with the first IU based on the first allowable maximum size, and generate a second L2P table associated with the second IU based on the second allowable maximum size, generating the first L2P table and the second L2P table based on the configuration information; and causing: first data to be stored in the first namespace using the first L2P table, and second data to be stored in the second namespace using the second L2P table.

BRIEF DESCRIPTION OF THE DRAWINGS

The following description includes discussion of figures having illustrations given by way of examples of implementations of embodiments of the present disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

In accordance with the present disclosure, devices and methods are provided for storing data in a memory device (e.g., a storage device). While, for purposes of brevity and clarity, the features of the disclosure described herein are in the context of a memory device (e.g., an SSD device), it will be understood that the principles of the present disclosure may be applied to any other suitable context for a device that manages data received from a host.

The present disclosure provides devices and methods that improve the ability of a host to create multiple namespaces with required capacity and IU sizes. In some embodiments, a spare DRAM space may be used to allocate a namespace with finer IU, and while maintaining the full logical capacity of a drive. In some embodiments, when the finer IU namespace capacity is not sufficient, the host may increase the capacity of finer IU namespace trading off a portion of the total logical capacity An SSD is a data storage device that uses integrated circuit assemblies as memory to store data persistently. SSDs have no moving mechanical components, and this feature distinguishes SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency.

The subject matter of this disclosure may be better understood by reference to FIGS. 1-5.

Figure 1:
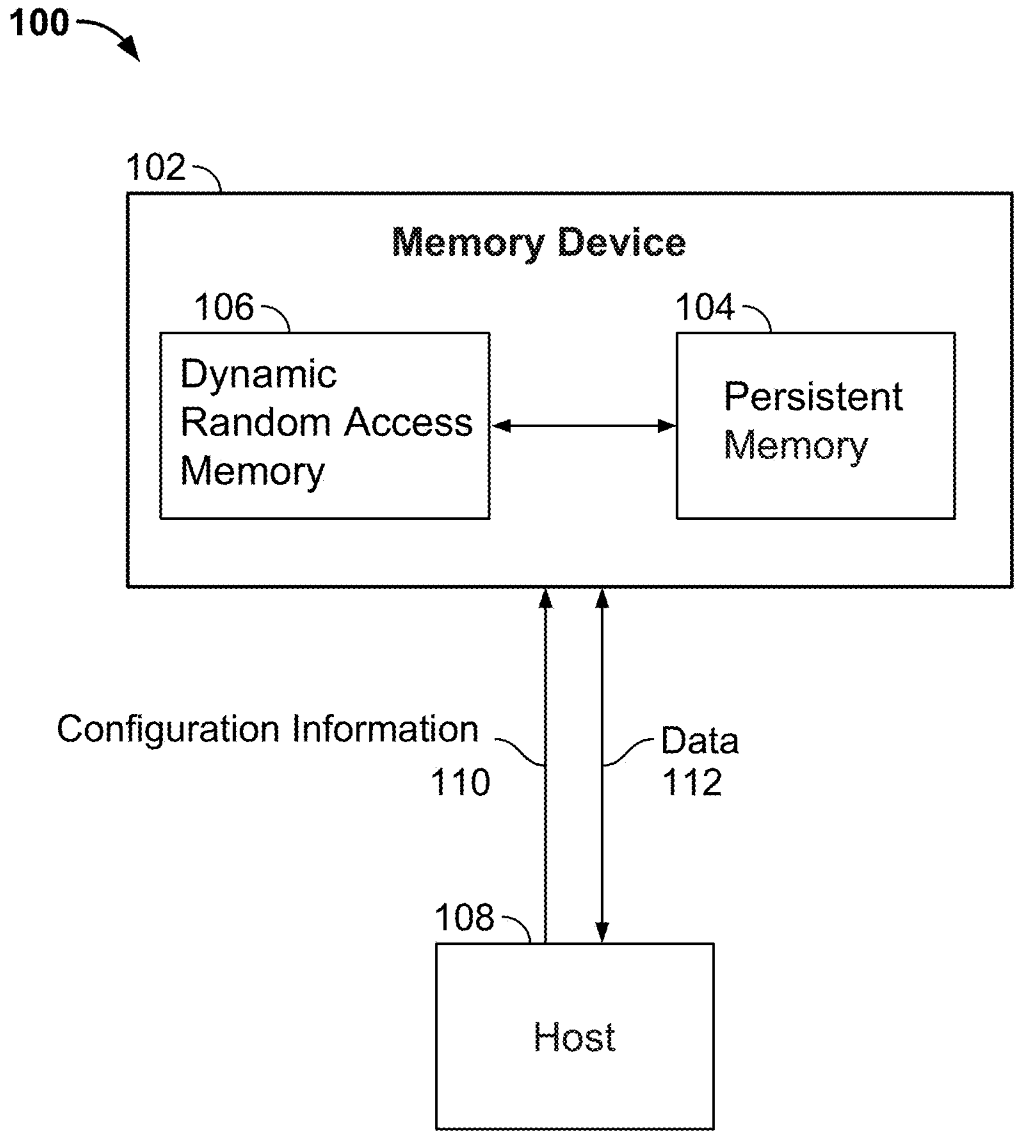
FIG. 1 shows a diagram of an illustrative system that includes a host and a memory device, in accordance with some embodiments of the present disclosure.

FIG. 1 shows an illustrative diagram of a system 100 that includes a host 106 and a memory device 102, in accordance with some embodiments of the present disclosure. In some embodiments, the memory device 102 may comprise a persistent memory 104 and a dynamic random access memory (DRAM) 106. The storage device 104 may be a solid state drive (SSD) or a hard disk drive (HDD). The memory device 104 may utilize the DRAM 106 for maintaining one or more logical to physical (L2P) tables (i.e., maps). The size of each L2P table may be directly proportional to an indirection unit (IU) size associated with the L2P table. A first application on the host 108 may use 4 KB size IUs, a second application associated with larger file objects (e.g., videos/photos) may write data at larger granularity and therefore may use IUs having larger sizes (e.g., 16 KB or larger). In some embodiments, the first application may be associated with a vector database. Vector data and metadata associated with the vector data may be stored at two granularities. For instance, the vector data may be stored by using courser granularity and the metadata may be stored by using finer granularity.

In some embodiments, the memory device 102 may transmit (i.e., advertise) to the host 108 information indicative of the maximum size of namespace(s) allowable with each associated IU sizes. For instance, the information may indicate a first allowable maximum size of a first namespace associated with a first indirection unit (IU) and a second allowable maximum size of a second namespace associated with a second IU. In some embodiments, the information indicative of the first allowable maximum size and the second allowable maximum size is based on at least one of a size of the DRAM 106 or a logical capacity associated with the persistent memory 104. The first IU and the second IU may be of different sizes. The first IU may be 16 KB in size and the second IU may be 4 KB in size. It should be understood however that these sizes are exemplary and the first and second IU may comprise any other sizes.

The host 108 may use the information to create namespaces with different IU size accordingly. For instance, in the case of a vector database, the host 108 may determine to create one large namespace for the vector data with coarser IU (e.g., equal to larger than 16 KB) and another small namespace for the metadata with finer IU (e.g., 4 KB). In some embodiments, the memory device 102 may transmit (i.e., advertise) the list of maximum logical space size per each IU size. In some embodiments, the number of L2P entries may be calculated based on the DRAM 106.

The memory device 102 may receive from the host 108 configuration information 110 comprising one or more instructions. The configuration information may comprise instructions to generate a first logical to physical (L2P) table associated with the first IU based on the first allowable maximum size, and to generate a second L2P table associated with the second IU based on the second allowable maximum size. The memory device 102 may generate the first L2P and the second L2P based on the configuration information 110 and may store the first and second L2P tables in the DRAM 1065. The memory device 102 may cause data 112 comprising a first data and a second data to be stored in the memory device 102. The memory device 102 may store the first data in the first namespace using the first L2P table, and the second data in the second namespace using the second L2P table. The first data may comprise a larger file object relative to the second data and therefore be associated with the first IU having a larger (i.e., coarser) IU size, and the second data may comprise a smaller file object relative to the first data and therefore be associated with the second IU having a smaller (i.e., finer) IU size. The first data may be metadata and the second data may be object data. The metadata may be associated with the object data.

In some embodiment, the memory device 102 may dynamically prepare a table of entries showing the supported namespace IU size(s), "Unallocated capacity per IU size" and "Allocatable Non-volatile memory (NVM) spare capacity" and transmit (i.e., share) the table with the host 108. The memory device 102 may transmit using a new vendor unique (VU) log command. In this manner the host 108 may create namespaces without needing to trade any logical capacity for finer IU namespace.

The VU log command may comprise two new parameters in addition to namespace (NS) management command defined in NVM express Base Specification. The first parameter may indicate an IU size, using which the host 108 may create a namespace based on minimum write data size for its use case. The second parameter may allow the host 102 to place a namespace IU table in either a regular DRAM or a spare DRAM or both or automatic. In other words, the second parameter may indicate whether the namespace IU table is placed in either a regular DRAM or a spare DRAM or both or automatic. When the host 108 chooses option "automatic" (i.e., the second parameter indicates "automatic"), the memory device 102 may utilize a spare DRAM first and then use regular DRAM to place the IU table.

In some embodiment, the memory device 102 may comprise a persistent memory having a size of 100 TB and the DRAM 106 may comprise a size of 25.075 GB. The memory device 102 may transmit a "Supported IU and Unallocated NVM capacity" table before any namespace is allocated. Table 1 below illustrates an exemplary "Supported IU and Unallocated NVM capacity" table.

TABLE 1

| IU size | Unallocated NVM Capacity (when entire unallocated space is configured using this IU) | Allocatable NVM spare capacity (allocating will not cause any drive logical capacity loss) |
|---|---|---|
| 4 KB | 25.075 TB | 100 GB |
| 16 KB | 100 TB | Not Applicable |

The host 108 may create a first namespace with NS ID=1 of size 50 TB with 16 KB IU size placing the IU table in a regular DRAM. Table 2 below illustrates an exemplary updated Table 1.

TABLE 2

| IU size | Unallocated NVM Capacity (when entire unallocated space is configured using this IU) | Allocatable NVM spare capacity (allocating will not cause any drive logical capacity loss) |
|---|---|---|
| 4 KB | 12.575 TB | 100 GB |
| 16 KB | 50 TB | Not Applicable |

Subsequently, the host 108 may create a second namespace NS ID=2 of size 50 GB with 4 KB IU size placing the IU table in spare DRAM. Table 3 below illustrates an exemplary updated Table 2.

TABLE 3

| IU size | Unallocated NVM Capacity (when entire drive is configured using this IU) | Allocatable NVM spare capacity (allocating will not cause any drive logical capacity loss) |
|---|---|---|
| 4 KB | 12.525 TB | 50 GB |
| 16 KB | 49.5 TB | Not Applicable |

It should be noted that the host 108 may still create a third namespace of size 49.5 TB with 16 KB IU size as indicated in Table 3.

The host 108 may ignore the unallocated capacity indication, and allocate a larger namespace with finer IU size. In this case, the host 108 may trade a portion of the usable logical capacity of the persistent memory 104. For instance, on an empty memory device, when the host creates NS ID=1 of size 10 TB with 4 KB IU placing the IU table in a regular DRAM, the memory device 102 may have DRAM capacity left to allocate only 60 TB with 16 KB IU size, thus total capacity may be reduced to ~70 TB. Table 4 below illustrates an exemplary "Supported IU and Unallocated NVM capacity" table in this scenario.

TABLE 4

| IU size | Unallocated NVM Capacity (when entire drive is configured using this IU) | Allocatable NVM spare capacity (allocating will not cause any drive logical capacity loss) |
|---|---|---|
| 4 KB | 15.075 TB | 100 GB |
| 16 KB | 60 TB | Not Applicable |

In some embodiments, when an application in the host 108 requires a coarse/fine IU Namespaces than the memory device 102 may provide using a spare DRAM. A manufacturer may overprovision the DRAM 106 per host 108 requirements or check if the application is compatible with reduced logical space. In some embodiments, when the host 108 requirement changes after the memory device installation, the host 108 may trade off some logical capacity. The memory device 102 may support multiple namespaces with various capacities and IU sizes while maintaining better Write Amplification Factor (WAF) and endurance.

Figure 2:
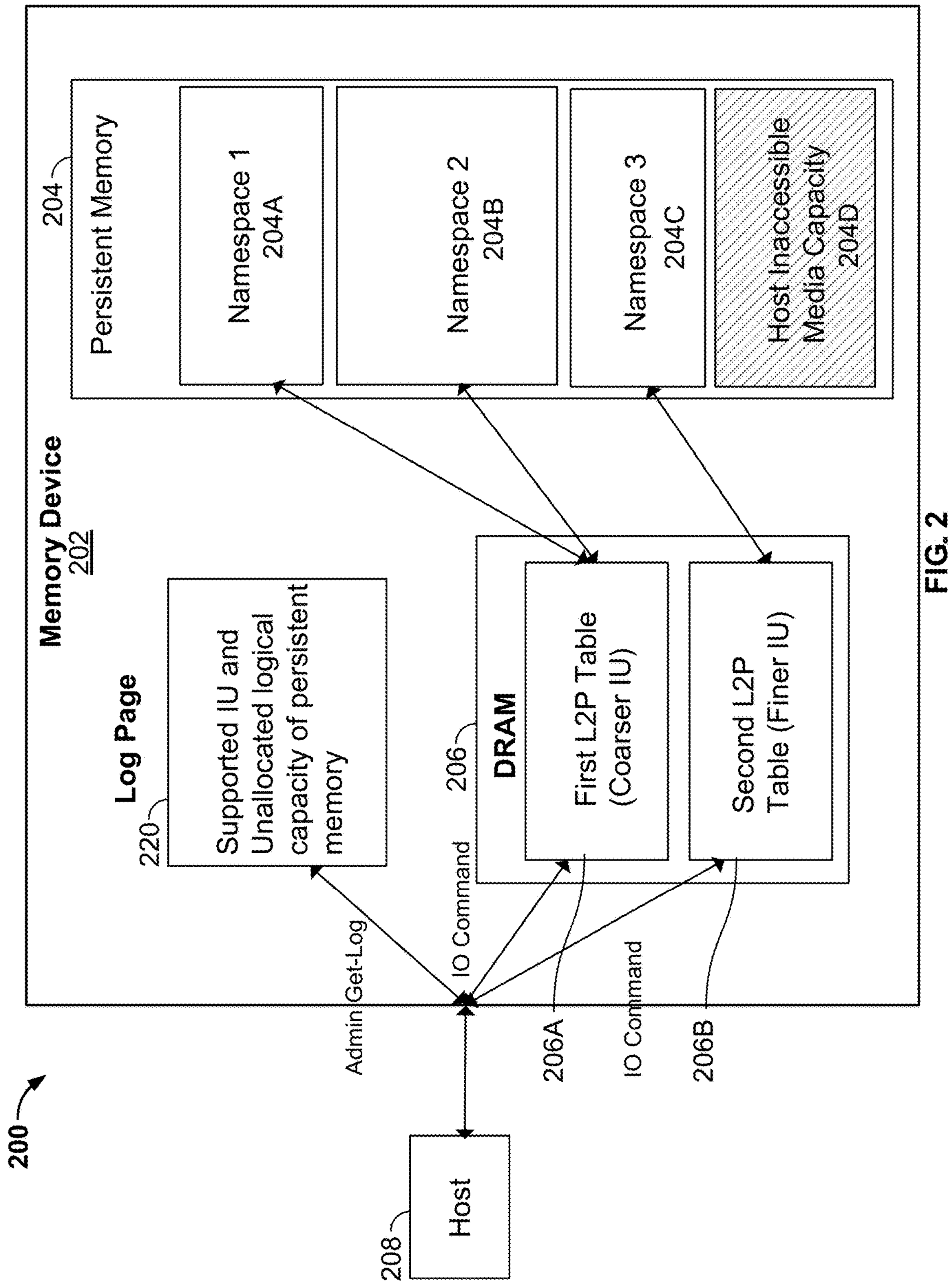
FIG. 2 shows a more detailed diagram of an illustrative system that includes a host and a memory device, in accordance with some embodiments of the present disclosure.

FIG. 2 shows an illustrative diagram of a system 200 that includes a host 208 and a memory device 202, in accordance with some embodiments of the present disclosure. The memory device 202 may comprise a log page 220, a DRAM 206, and a persistent memory 204. The persistent memory 204 may be an NVM. The log page 220 may comprise information regarding supported IU sizes by the memory device 202 as well as the unallocated logical capacity of the persistent memory 204.

The host 208 may access the log page 220 by using an Admin Get-Log command. The memory device 202 may transmit information indicative of at least one of supported IU sizes, the unallocated logical capacity of the persistent memory 204 and a maximum allowable size of a namespace associated with each supported IU size and a size of the DRAM 206 to the host 208.

The host 208 may determine to create a first namespace 204A having a first portion of a logical capacity of the persistent memory 204 and a second namespace 204B having a second portion of the logical capacity of the persistent memory 204, the first and second namespace 204A, 204B may be associated with large object data. The host 208 may determine to create a third namespace 204C having a third portion of the logical capacity of the persistent memory 204 associated with finer data (e.g., metadata).

The host 208 may determine based on the received information a size of a first L2P table 206A associated with a first IU suitable for larger (i.e., coarser) object data (for example IUs having size 16 KB or larger) and a second L2P table 206B associated with a second IU suitable for finer data (for example IUs having size 4 KB). The host 208 may associates the first and second namespaces 204A, 204B with the first L2P table 206A and the third namespace 204C with the second L2P table 206B. The total size of portions of the logical capacity associated with each IU size may be smaller than the maximum allowable size of a namespace associated with the same IU size.

The first L2P table 206A and the second L2P table 206B may be determined such that the available capacity of the DRAM 206 may be fully utilized. The host 208 may transmit a configuration information comprising one or more instructions (i.e., input/output (IO) commands) for generating the first L2P table 206A and the second L2P table 206B to the memory device 202. The one or more instructions may be transmitted together or individually. For instance, each OI command may be transmitted individually or all IO commands can be transmitted together.

The memory device 202 may generate the first L2P 206A and the second L2P table 206B based on the configuration information. The memory device 202 may store the generated L2P tables in the DRAM 206. The memory device 202 may allocate the first portion of the logical capacity of the persistent memory 204 to the first namespace 204A and the second portion of the logical capacity of the persistent memory 204 to the second namespace 204B, and the third portion of the logical capacity of the persistent memory 204 to the third namespace 204C. The memory device 202 may store data in the first and second namespaces 204A, 204B using the first L2P table 206A and may store data in the third namespace 204C using the second L2P table 206B. It should be appreciated that the number of L2P tables and namespaces are merely exemplary and in other embodiments, there may be more than or fewer than three namespaces, for instance, four namespaces or five namespaces.

The persistent memory 204 may comprise a fourth portion 204D of the logical capacity that may be inaccessible to the host 206 due to the capacity of the DRAM 206 being full. This may be due to the determined combination of the first and second L2P tables 206A, 206B. Since there is no available free space on the DRAM 206 for extending the first and second L2P tables 206A, 206B or creating a third L2P table, the host 208 may not be able to write to or read from the fourth portion 204D.

In this manner, the host 206 may dynamically configure a portion of the memory device 202 for small data and a portion of the memory device 202 for large data in accordance with the needs of the host 208. Thus, reducing the maximum needed DRAM capacity whilst decreasing Write Amplification Factor (WAF) and increasing endurance of the memory device 202.

Figure 3:
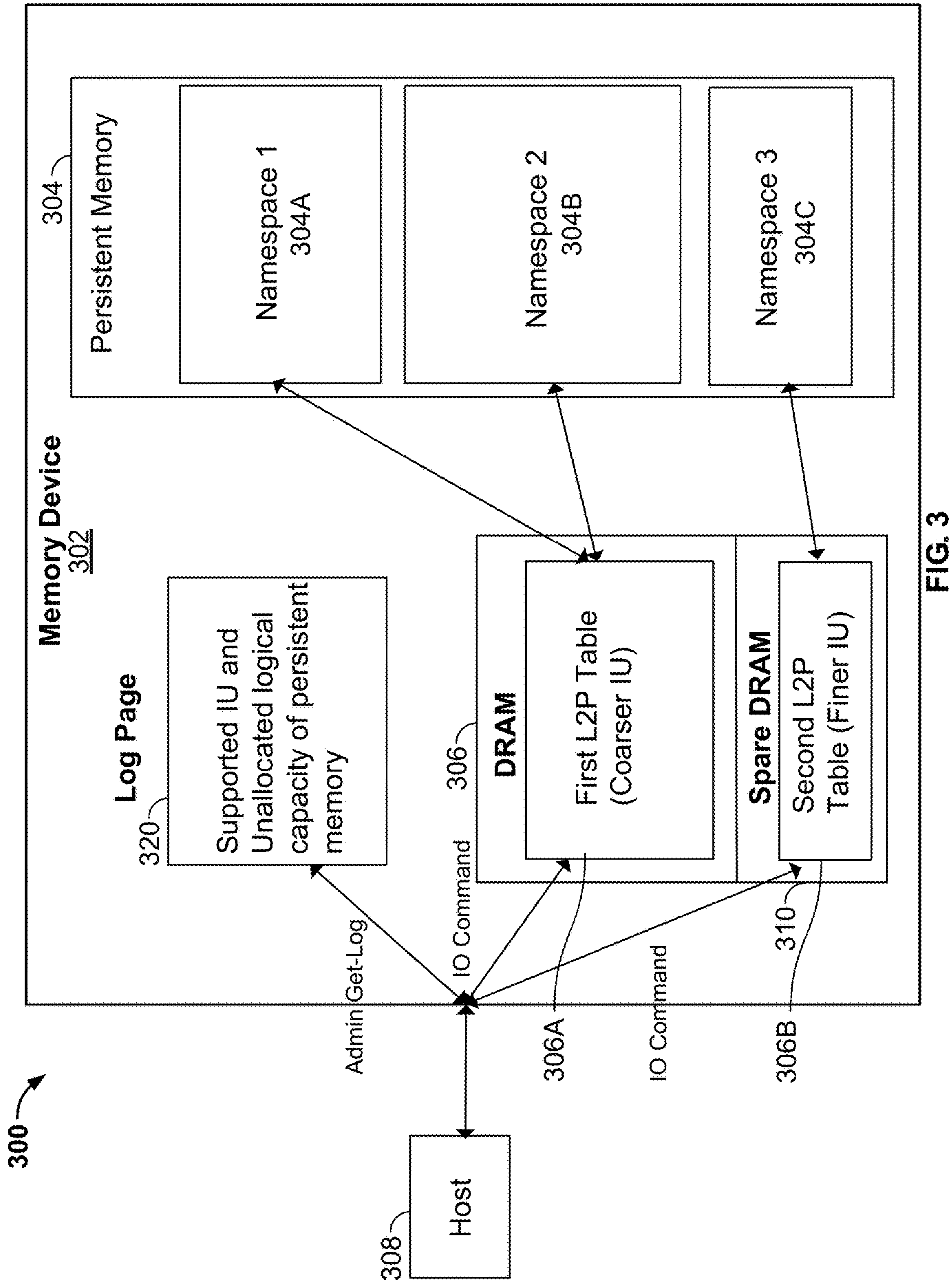
FIG. 3 shows another more detailed diagram of an illustrative system that includes a host and a memory device, in accordance with some embodiments of the present disclosure.

FIG. 3 shows an illustrative diagram of a system 300 that includes a host 308 and a memory device 302, in accordance with some embodiments of the present disclosure. The memory device 302 may comprise a log page 320, a DRAM 306, a spare DRAM 310 and a persistent memory 304. The persistent memory 304 may be an NVM. The log page 320 may comprise information regarding supported IU sizes by the memory device 302 as well as the unallocated logical capacity of the persistent memory 304.

The host 308 may access the log page 320 by using an Admin Get-Log command or any other suitable command. The memory device 302 may transmit information indicative of at least one of supported IU sizes, the unallocated logical capacity of the persistent memory 304 and a maximum allowable size of a namespace associated with each supported IU size, a size of the DRAM 306 and a size of the space DRAM 310 to the host 308.

The host 308 may determine to create a first namespace 304A having a first portion of a logical capacity of the persistent memory 304 and a second namespace 304B having a second portion of the logical capacity of the persistent memory 304, the first and second namespace 304A, 304B associated with large object data. The host 308 may determine to create a third namespace 304C having a third portion of the logical capacity of the persistent memory 304 associated with finer data (e.g., metadata).

The host 308 may determine based on the received information a size of a first L2P table 306A associated with a first IU suitable for larger (i.e., coarser) object data (for example IUs having size 16 KB or larger) and a second L2P table 306B associated with a second IU suitable for finer object data (for example IUs having size 4 KB). The host 308 may associates the first and second namespaces 304A, 304B with the first L2P table 306A and the third namespace 304C with the second L2P table 306B. The total size of portions of the logical capacity associated with each IU size may be smaller than the maximum allowable size of a namespace associated with the same IU size.

In this embodiment, the first L2P table 306A may be determined such that the entirety of the available capacity of the DRAM 306 may be fully utilized for the first L2P table 306A and the second L2P table 306B may be determined such that the capacity provided by the spare DRAM 310 is fully utilized for the second L2P table 306B. The host 308 may transmit a configuration information comprising instructions (i.e., input/output (IO) commands) for generating the first L2P table 306A and the second L2P table 306B to the memory device 302. The one or more instructions may be transmitted together or individually. For instance, each OI command may be transmitted individually or all IO commands can be transmitted together.

The memory device 302 may generate the first L2P 306A and the second L2P table 306B based on the configuration information. The memory device 302 may store the first L2P table in the DRAM 306 and the second L2P table in the spare DRAM 310. The memory device 302 may allocate the first portion of the logical capacity of the persistent memory 304 to the first namespace 304A and the second portion of the logical capacity of the persistent memory 304 to the second namespace 304B, and the third portion of the logical capacity of the persistent memory 304 to the third namespace 304C. The memory device 302 may store data in the first and second namespaces 304A, 304B using the first L2P table 306A and may store data in the third namespace 304C using the second L2P table 306B. It should be appreciated that the number of L2P tables and namespaces are merely exemplary and in other embodiments, there may be more than or fewer than three namespaces, for instance, four namespaces or five namespaces.

In this manner, the host 308 may create two coarser IU and one finer IU namespaces on the memory device 302 with the spare DRAM 310 without losing any logical capacity. The DRAM 306 and the spare DRAM 310 may be used optimally. The host 308 may have access to a finer IU namespace that is utilized for writes with small granularity and a coarser IU namespace that is used for writes with larger granularity. This may reduce the maximum needed DRAM capacity whilst decreasing Write Amplification Factor (WAF) and increasing endurance of the memory device 302.

Figure 4:
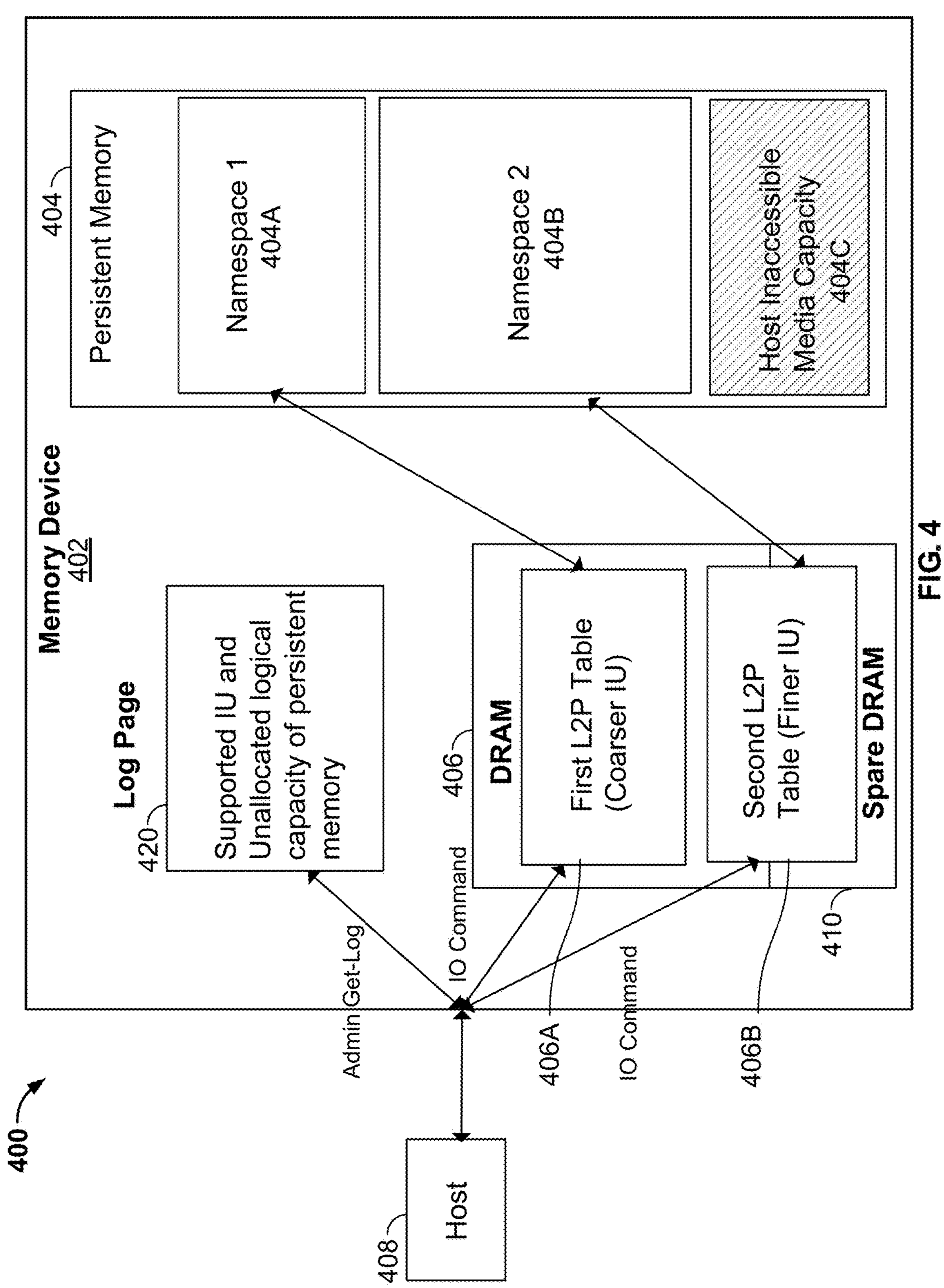
FIG. 4 shows a another more detailed diagram of an illustrative system that includes a host and a memory device, in accordance with some embodiments of the present disclosure.

FIG. 4 shows an illustrative diagram of a system 400 that includes a host 408 and a memory device 402, in accordance with some embodiments of the present disclosure. The memory device 402 may comprise a log page 420, a DRAM 406, a spare DRAM 410 and a persistent memory 404. The persistent memory 404 may be an NVM. The log page 420 may comprise information regarding supported IU sizes by the memory device 402 as well as the unallocated logical capacity of the persistent memory 404.

The host 408 may access the log page 420 by using an Admin Get-Log command. The memory device 402 may transmit information indicative of at least one of supported IU sizes, the unallocated logical capacity of the persistent memory 404 and a maximum allowable size of a namespace associated with a supported IU size, a size of the DRAM 406 and a size of the space DRAM 410 to the host 408.

The host 408 may determine to create a first namespace 404A having a first portion of a logical capacity of the persistent memory 404 and a second namespace 404B having a second portion of the logical capacity of the persistent memory 404. The first namespace 404A may be associated with large object data and the second portion of the logical capacity of the persistent memory 404 may be associated with fine data (e.g., metadata).

The host 408 may determine based on the received information a size of a first L2P table 406A associated with a first IU suitable for larger (i.e., coarser) object data (for example IUs having sizes 16 KB or larger) and a second L2P table 406B associated with a second IU suitable for finer object data (for example IUs having size 4 KB). The host 408 may associates the first namespace 404A with the first L2P table 406A and the second namespace 404B with the second L2P table 406B. The total size of portions of the logical capacity associated with each IU size may be smaller than the maximum allowable size of a namespace associated with the same IU size.

In this embodiment, the first L2P table 406A may be determined such that a first portion of the available capacity of the DRAM 406 may be utilized for the first L2P table 406A and the second L2P table 306B may be determined such that a second portion of the available capacity of the DRAM 410 and the available capacity of the spare DRAM 410 are utilized for the second L2P table 406B. The host 408 may transmit a configuration information comprising instructions (i.e., input/output (IO) commands) for generating the first L2P table 406A and the second L2P table 406B to the memory device 402. The one or more instructions may be transmitted together or individually. For instance, each OI command may be transmitted individually or all IO commands can be transmitted together.

The memory device 402 may generate the first L2P 406A and the second L2P table 406B based on the configuration information. The memory device 402 may store the first L2P table in the first portion of the DRAM 406 and the second L2P table in the second portion of the DRAM 406 and the spare DRAM 410. The memory device 402 may allocate the first portion of the logical capacity of the persistent memory 404 to the first namespace 404A and the second portion of the logical capacity of the persistent memory 404 to the second namespace 404B. The memory device 402 may store data in the first namespace 404A using the first L2P table 406A and may store data in the second namespace 404B using the second L2P table 406B. It should be appreciated that the number of L2P tables and namespaces are merely exemplary and in other embodiments, there may be more than or fewer than three namespaces, for instance, four namespaces or five namespaces.

The persistent memory 404 may comprise a third portion 404C of the logical capacity that may be inaccessible to the host 404 due to the capacity of the DRAM 406 and the capacity of the spare DRAM 410 being fully utilized. This may be due to the determined combination of the first and second L2P tables 406A, 406B. Since there is no available free space on the DRAM 406 or the spare DRAM 410 for extending the first and second L2P tables 406A, 406B or creating a third L2P table, the host 408 may not be able to write to or read from the third portion 404C.

In this manner, the host 408 may create a larger finer IU namespaces on the memory device 402 that exceed the announced spare DRAM capacity, trading a portion of the persistent memory's logical capacity. The host 408 may have access to a larger finer IU namespace that is utilized for writes with small granularity and a coarser IU namespace that is used for writes with larger granularity. This may reduce the maximum needed DRAM capacity whilst decreasing Write Amplification Factor (WAF) and increasing endurance of the memory device 402.

Figure 5:
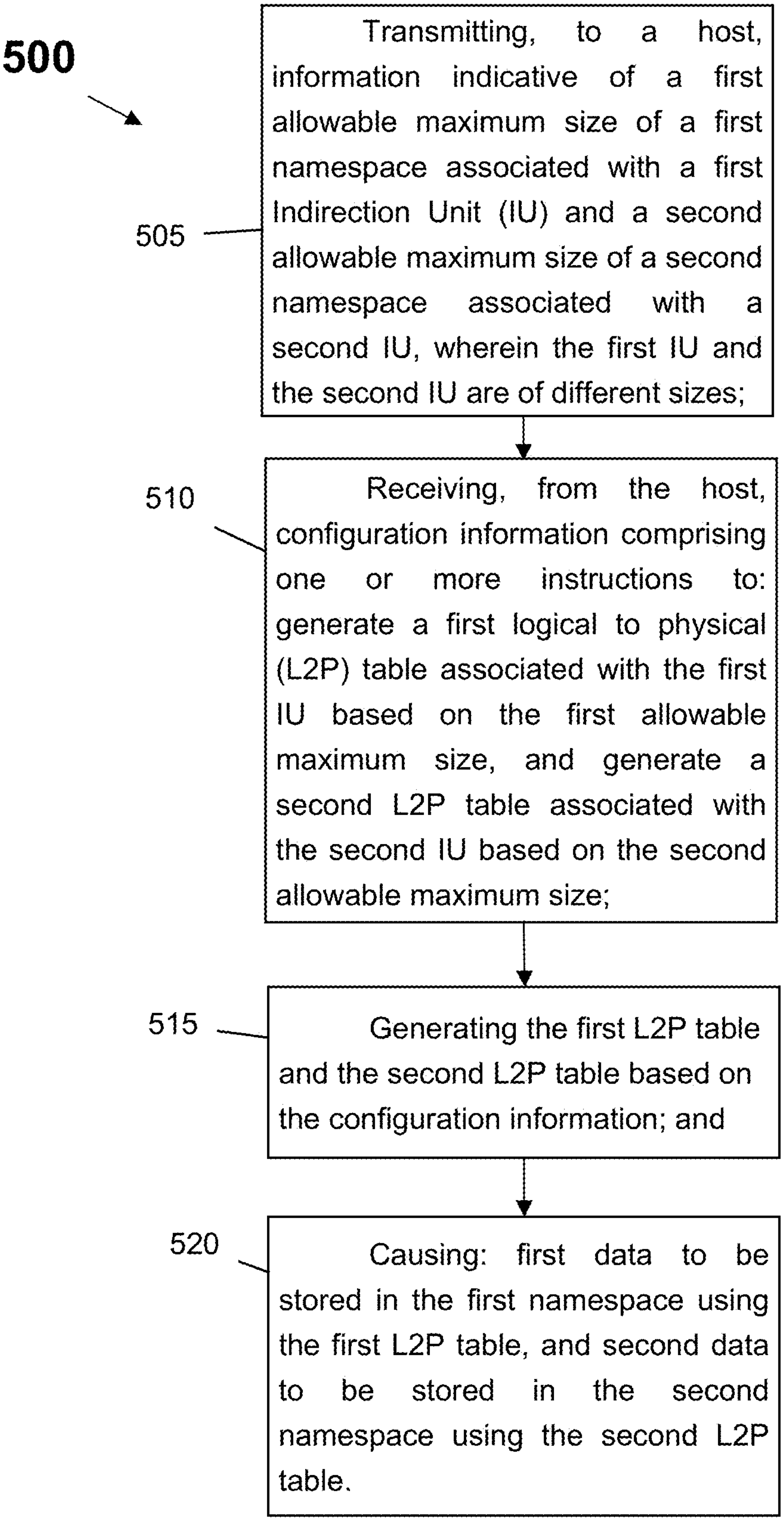
FIG. 5 shows a flowchart of illustrative steps for storing data on a memory device, in accordance with some embodiments of the present disclosure.

FIG. 5 shows an illustrative flowchart of a method 500 for storing data on a memory device, in accordance with some embodiments of the present disclosure. The memory device may be the memory device 102, 202, 302 or 402 of FIGS. 1 to 4.

The method 500 may comprise transmitting 505, to a host (for example the host 108, 208, 308 and 408 of FIGS. 1 to 4), information indicative of a first allowable maximum size of a first namespace associated with a first Indirection Unit (IU) and a second allowable maximum size of a second namespace associated with a second IU, wherein the first IU and the second IU are of different sizes. The method 500 may comprise receiving 510, from the host, configuration information comprising one or more instructions to: generate a first logical to physical (L2P) table associated with the first IU based on the first allowable maximum size, and generate a second L2P table associated with the second IU based on the second allowable maximum size. The method 500 may comprise generating 515 the first L2P table and the second L2P table based on the configuration information; and causing 520: first data to be stored in the first namespace using the first L2P table, and second data to be stored in the second namespace using the second L2P table.

In some embodiments, the memory device may comprise dynamic random access memory (DRAM) and persistent memory, and wherein the information indicative of the first allowable maximum size and the second allowable maximum size may be based on at least one of a size of the DRAM or a logical capacity associated with the persistent memory.

In some embodiments, the logical capacity associated with the persistent memory may be an unallocated portion of the logical capacity associated with the persistent memory.

In some embodiments, the first L2P table may be associated with the first namespace being allocated a first portion of a logical capacity and the second L2P table may be associated with a second namespace being allocated a second portion of the logical capacity, wherein the first IU has a size larger than the second IU and the first portion of the logical capacity is larger than the second portion of the logical capacity.

In some embodiments, the memory device may comprise dynamic random access memory (DRAM), and wherein the first L2P and the second L2P may be stored on the DRAM.

In some embodiments, the DRAM may comprise a used portion and a spare portion.

In some embodiments, the first L2P table may be stored on the used portion and the second L2P table may be stored on the spare portion.

In some embodiments, the first L2P may be stored on a first part of the used portion and the second L2P table may be stored on a second part of the used portion and on the spare portion.

In some embodiments, the memory device may comprise a persistent memory and a logical capacity associated with the persistent memory may comprise an inaccessible portion.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method of storing data in a memory device, wherein the memory device comprises dynamic random access memory (DRAM), the method comprising:

transmitting, to a host, information indicative of a first allowable maximum size of a first namespace associated with a first indirection unit (IU) and a second allowable maximum size of a second namespace associated with a second IU, wherein the first IU and the second IU are of different sizes, and wherein the information indicative of the first allowable maximum size and the second allowable maximum size is based on a size of the DRAM;

receiving, from the host, configuration information comprising one or more instructions to:

generate a first logical to physical (L2P) table associated with the first IU based on the first allowable maximum size, and generate a second L2P table associated with the second IU based on the second allowable maximum size;

generating the first L2P table and the second L2P table based on the configuration information; and causing:

first data to be stored in the first namespace using the first L2P table, and second data to be stored in the second namespace using the second L2P table.

2. The method of claim 1, wherein the memory device comprises persistent memory, and wherein the information indicative of the first allowable maximum size and the second allowable maximum size is based on a logical capacity associated with the persistent memory.

3. The method of claim 2, wherein the logical capacity associated with the persistent memory is an unallocated portion of the logical capacity associated with the persistent memory.

4. The method of claim 1, wherein the first L2P table is associated with the first namespace being allocated a first portion of a logical capacity and the second L2P table is associated with a second namespace being allocated a second portion of the logical capacity, wherein the first IU has a size larger than the second IU and the first portion of the logical capacity is larger than the second portion of the logical capacity.

5. The method of claim 1, wherein the first L2P and the second L2P are stored on the DRAM.

6. The method of claim 5, wherein the DRAM comprises a used portion and a spare portion.

7. The method of claim 6, wherein the first L2P table is stored on the used portion and the second L2P table is stored on the spare portion.

8. The method of claim 6, wherein the first L2P is stored on a first part of the used portion and the second L2P table is stored on a second part of the used portion and on the spare portion.

9. The method of claim 5, wherein the memory device comprises a persistent memory and a logical capacity associated with the persistent memory comprises an inaccessible portion.

10. A system comprising:

a memory device coupled to a host, wherein the memory device comprises dynamic random access memory (DRAM), and wherein the memory device comprises processing circuitry to:

transmit, to the host, information indicative of a first allowable maximum size of a first namespace associated with a first indirection unit (IU) and a second allowable maximum size of a second namespace associated with a second IU, wherein the first IU and the second IU are of different sizes, and wherein the information indicative of the first allowable maximum size and the second allowable maximum size is based on a size of the DRAM;

receive, from the host, configuration information comprising one or more instructions to:

generate a first logical to physical (L2P) table associated with the first IU based on the first allowable maximum size, and generate a second L2P table associated with the second IU based on the second allowable maximum size;

generate the first L2P table and the second L2P table based on the configuration information; and cause:

first data to be stored in the first namespace using the first L2P table, and second data to be stored in the second namespace using the second L2P table.

11. The system of claim 10, wherein the memory device comprises a solid state drive.

12. The system of claim 10, wherein the memory device comprises persistent memory, and wherein the information indicative of the first allowable maximum size and the second allowable maximum size is based on a logical capacity associated with the persistent memory.

13. The system of claim 12, wherein the logical capacity associated with the persistent memory comprises an unallocated portion of the logical capacity associated with the persistent memory.

14. The system of claim 12, wherein the first L2P table and the second L2P table are stored on the DRAM.

15. The system of claim 14, wherein the DRAM comprises a used portion and a spare portion.

16. The system of claim 15, wherein the first L2P table is stored on the used portion and the second L2P is stored on the spare portion.

17. The system of claim 15, wherein the first L2P table is stored on a first part of the used portion and the second L2P is stored on a second part of the used portion and on the spare portion.

18. The system of claim 14, wherein the memory device comprises a persistent memory and a logical capacity associated with the persistent memory comprises an inaccessible portion.

19. The system of claim 10, wherein the first L2P table is associated with the first namespace being allocated a first portion of a logical capacity and the second L2P table is associated with a second namespace being allocated a second portion of the logical capacity, wherein the first IU has a size larger than the second IU and the first portion of the logical capacity is larger than the second portion of the logical capacity.

20. A non-transitory computer readable medium storing program code that, when executed, performs a method comprising:

transmitting, to a host, information indicative of a first allowable maximum size of a first namespace associated with a first indirection unit (IU) and a second allowable maximum size of a second namespace associated with a second IU, wherein the first IU and the second IU are of different sizes, and wherein the information indicative of the first allowable maximum size and the second allowable maximum size is based on a size of dynamic random access memory (DRAM) of a memory device;

receiving, from the host, configuration information comprising one or more instructions to:

generate a first logical to physical (L2P) table associated with the first IU based on the first allowable maximum size, and generate a second L2P table associated with the second IU based on the second allowable maximum size;

generating the first L2P table and the second L2P table based on the configuration information; and causing:

first data to be stored in the first namespace using the first L2P table, and second data to be stored in the second namespace using the second L2P table.

* * * * *